United States Patent [19]

Seiler

[11] 4,186,690
[45] Feb. 5, 1980

[54] ANIMAL GROOMING TETHERING DEVICE

[76] Inventor: John J. Seiler, 10414 E. Jefferson Rd., Osceola, Ind. 46561

[21] Appl. No.: 857,402

[22] Filed: Dec. 5, 1977

[51] Int. Cl.² ............................................... A01K 1/06
[52] U.S. Cl. .................................. 119/110; 24/115 F; 24/201 TR; 119/103; 280/193
[58] Field of Search ...................... 119/103, 110, 114; 280/193; 24/201 TR, 115 F

[56] References Cited

U.S. PATENT DOCUMENTS

| 2,370,232 | 2/1945 | Creekbaum | 280/193 |
| 2,902,976 | 9/1959 | Wilson | 119/114 X |
| 3,120,836 | 2/1964 | Braun ing | 119/103 |
| 3,266,464 | 8/1966 | Davis | 119/103 |
| 3,540,089 | 11/1970 | Franklin | 119/110 X |
| 4,041,905 | 8/1977 | Prager et al. | 119/103 |

Primary Examiner—Russell R. Kinsey
Assistant Examiner—Daniel J. Leach
Attorney, Agent, or Firm—Marmaduke A. Hobbs

[57] ABSTRACT

An animal grooming tethering device in which a safety break-away clip is used, having two generally resilient parallel arms connected to one another at one end, and a band slidable on the arms to adjust the clip to release the tether at a predetermined force corresponding to the weight of the animal. The device is intended for use as a leash on a grooming table, and will prevent injury to the animal in the event the animal jumps or falls from the table.

9 Claims, 5 Drawing Figures

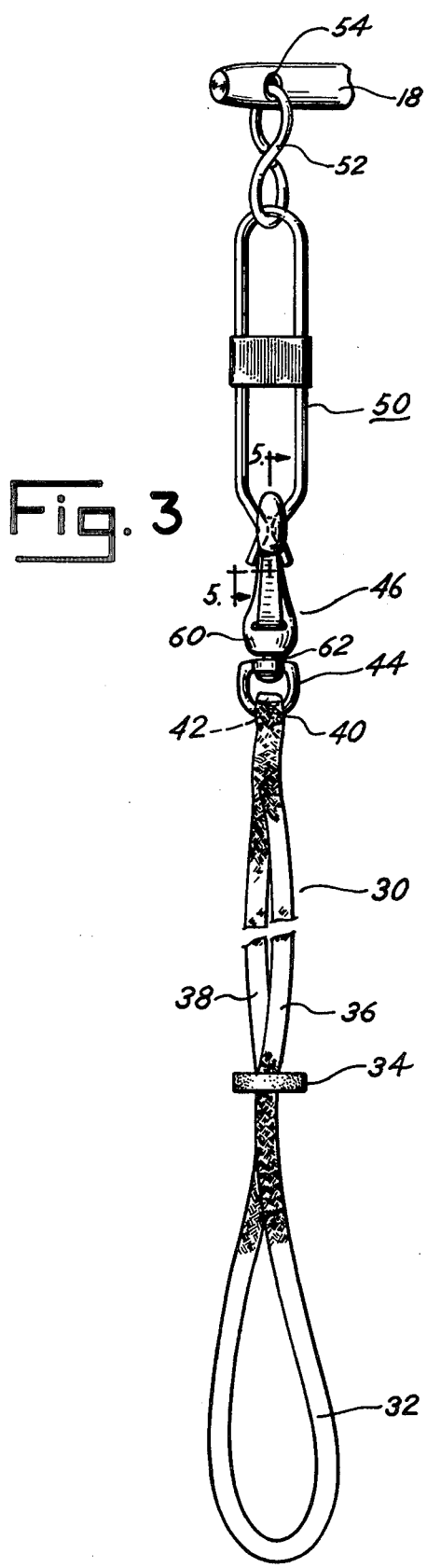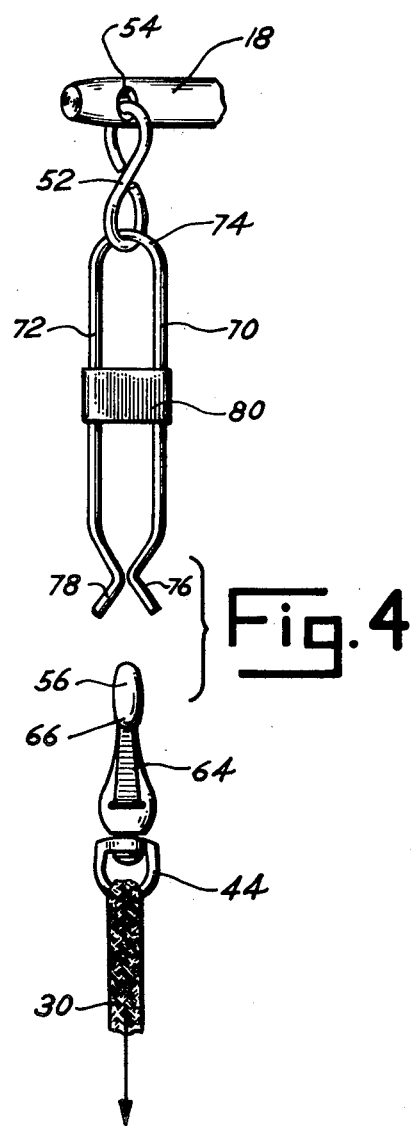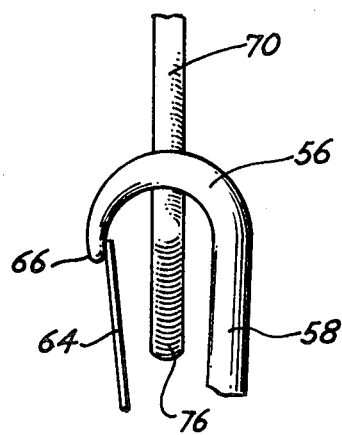

ANIMAL GROOMING TETHERING DEVICE

In the grooming of animals, such as show dogs, the animal is normally placed on a table having a top located several feet above the floor, to position the animal at a height convenient for performing the grooming operation. The animal is usually restrained on the table during grooming by a tether connected to an arm rigidly supported by the table and extending to a point a short distance above the animal, and the tether is of such a length that it retains the animal in sitting or at least in a partially upright position on the table. The tether is normally firmly attached to the arm at one end and has a noose at the other end which is placed over the animal's head and is tightened around the neck. Animals sometimes become excited during the grooming operation and will not remain still on the table, and hence occasionally fall or slip or try to jump from the table. To be effective in restraining the animal on the table, the tether is not sufficiently long that it will permit the animal to reach the floor in the event of a fall, and hence will suspend the animal from the supporting arm on the table in the event of such an accident. This type of accident usually results in injuring the animal, and may result in strangulation and death of, or permanent injury to the animal. Attempts have been made in the past to protect the tethered animals from injuries resulting from such accidents, and one device for providing such protection is disclosed in U.S. Pat. No. 4,041,905. While the patented device will provide the necessary protection and perform satisfactorily under most conditions, the device is relatively complicated and expensive. It is therefore one of the principal objects of the present invention to provide a tethering device for use in grooming animals on a table or other elevated surface, which provides effective restraining action during the grooming operation, and yet fully releases the animal in the event it falls from the table, thus preventing the animal from being suspended on the tether or otherwise restrained in a position which might result in injury to the animal.

Another object of the invention is to provide a tethering device for grooming animals, which has a relatively simple safety break-away clip incorporated therein, and which can be readily and reliably adjusted to the weight of the animal so that it will effectively restrain the animal on the table, and yet quickly release the animal in the event it falls from the table.

Still another object is to provide a tethering safety clip for use in animal grooming tethers, which is easy to adjust to the size and weight of the animal, and which can be readily incorporated in a conventional tether without any substantial modification of the tether construction.

Additional objects and advantages of the present invention will become apparent from the following description and accompanying drawings, wherein:

FIG. 3 is an elevational view of the tethering device as shown in FIG. 1, and containing the safety clip shown in FIG. 2, with the parts of the tethering device assembled in the manner in which they are normally used;

FIG. 4 is a fragmentary elevational view of the tethering device shown in FIG. 3, illustrating the manner in which the break-away clip functions; and FIG. 5 is an enlarged fragmentary cross sectional view of the lower portion of the retaining clip used in the tethering device.

Figure 1:
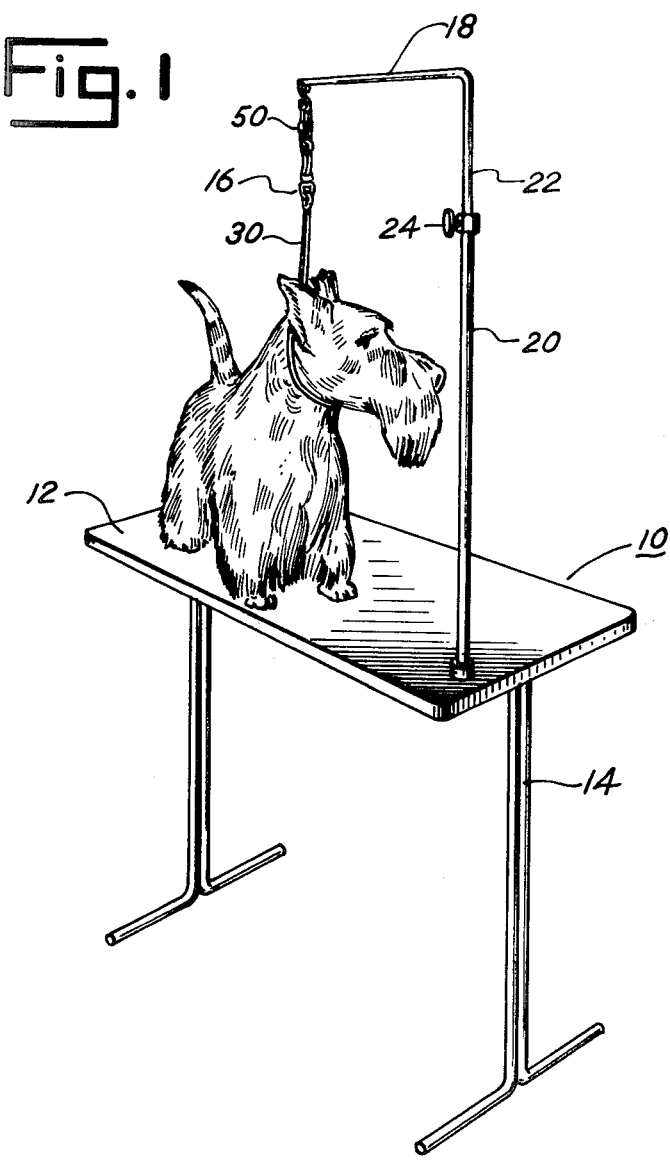
FIG. 1 is a perspective view of a grooming table with a dog being held thereon by the present tethering device in position for the grooming operation.
Figure 2:
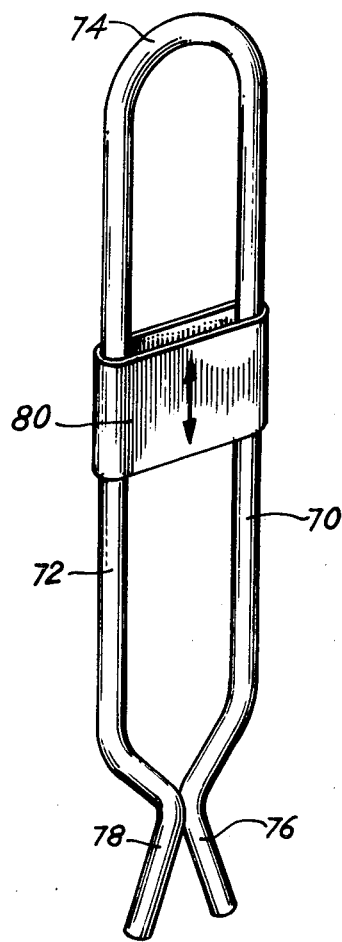
FIG. 2 is an enlarged perspective view of a safety break-away retaining clip used in the tethering device as shown in FIG. 1.

Referring more specifically to the drawings, and to FIG. 1 in particular, numeral 10 indicates generally a table for grooming dogs, the table having a top 12 on which the dog is placed for grooming, and legs 14 rigidly supporting the top several feet above the floor for placing the animal in a convenient grooming position. The animal is restrained on the table by the present tethering device 16 attached to arm 18 which is connected to a post 20 rigidly mounted on and supported by table top 12. The arm 18 is adjustable vertically by the telescopic rod 22 and a tube extending downwardly into post 20 and being held in an adjusted position by a threaded thumb screw 24. The present device may effectively be used with various types of tables and tether support arms, the one shown in the drawings being included merely for the purpose of illustrating the manner in which the present tethering device is used.

The complete tether assembly, which is best seen in FIG. 3, consists of a leash 30 having a noose 32 at the lower end thereof, and a slidable button 34 which is used to restrict and release the noose by moving it upwardly and downwardly on the two lines 36 and 38 forming the leash. The upper end of the leash contains an end portion 40 having a hole 42 therethrough for receiving a ring 44 of snap-hook 46. The snap-hook is releasably attached to and supported by a break-away retaining clip indicated generally by numeral 50, the clip being supported by a link 52 extending through a hole 54 in the outer end of arm 18. When an animal, such as a dog, is to be groomed, he is placed on the table and the noose 32 slipped over his head and loosely tightened around the neck by sliding button 34 downwardly near the dog's neck. The tethering assembly is preferably sufficiently short that the animal must sit upright on his haunches with his front legs straight. The amount of play provided by the tether is adjusted by moving vertical rod 22 of arm 18 upwardly or downwardly in post 20 after screw 24 has been loosened. After the adjustment has been made, the screw is retightened to hold the arm in a fixed position, the arm and post being of sufficient strength and rigidity to support the full weight of the animal. A leaf spring 64 connected to base 60 and seating on the free end 66 of the hook 46 permits a link or other element to be easily snapped into the hook. The hook includes a curved part 56 joined rigidly to a straight portion 58, which in turn is connected to base 60, the base being pivotally connected to ring 44 by a pin 62. The leash 30, including the hook 46 and link 52 may be considered conventional for the purpose of the present description, although a ring may be used in place of the hook and, in the present device, would serve the same purpose as the hook.

The primary feature of the present invention is the safety break-away retaining clip 50, which consists of a spring wire body having arms 70 and 72 joined by a U-shaped portion 74. The two arms 70 and 72 have inwardly extending generally V-shaped free ends 76 and 78 which may or may not be in contact with one another. The two arms are sufficiently resilient that they will readily spring apart to accept hook 46 or other ring-like means or link, without any distortion. The pressure required to press the two end members apart sufficiently to engage or disengage the hook is controlled by an adjustable latch member 80 which is shown in the drawings as a metal band. The length of the internal opening of the band is substantially the same as the distances between the outside surfaces of the two arms 70 and 72 when end members 76 and 78 are in firm contact with one another. Consequently, when the band is moved downwardly, the amount of pressure required to separate the two end members 76 and 78 to permit hook portion 56 to pass therebetween, is substantially increased. As the member is moved progressively away from the lower ends, the amount of pressure required to separate the two ends substantially decreases.

As a result of the movement of member 80 toward and away from the lower ends 76 and 78, the pressure required can be accurately adjusted to the weight of any particular animal so that the hook will disengage itself from the clip at a weight somewhat less than that of the animal. Thus, should the animal fall from the table, the clip will permit the hook to disengage itself and release the leash before the tether assembly has been subjected to the full weight of the animal. The animal is thereby prevented from dangling in the air or from being partially suspended in a position where serious injury could occur.

Arms 70 and 72 tend to spring outwardly, thus applying pressure on the inner side of band 80, thereby causing the band to stay in any adjusted position until it is intentionally moved by the person in charge of the animal on the table. The band slides from its upward position, where very little pressure is required to separate the two ends 76 and 78, to a point in the lower portion where the clip is virtually a solid link. Any force for disengaging the hook from the clip representing the weight of the animal, can readily be selected, and, since member 80 remains in any adjusted position, the clip is a reliable safety device for use in tethering an animal on a grooming table or on some other similar supporting surface.

In the operation of the present animal grooming tethering device, the animal is placed on the table and noose 32 is placed over the head and around the neck, and button 34 is tightened to the point where the noose forms an effective collar. The hook 46 is firmly inserted in clip 50, which is normally permanently attached to arm 18. In attaching the hook to the clip, the member 80 has preferably been preset to a point representing a weight slightly less than that of the animal. This operation is performed prior to securing the dog on the table by inserting the hook in the clip and attaching weighing scales to the leash or to ring 44 and adjusting the band by pulling the scales to the point where the clip will release the hook at the number of pounds desired. If the amount of force in pounds is greater than the weight of the dog, member 80 is slipped upwardly, i.e. away from the two ends 76 and 78, to decrease the force required to separate the ends and permit the hook to become disengaged from the clip. When member 80 has been slipped to the position at which the desired force required to disengage the hook is obtained, the clip can be left in the adjusted position as long as that particular animal is being groomed on the table and from time to time thereafter, provided the weight of the animal remains substantially constant.

If, when the animal is being groomed, he becomes excited and jumps or is accidentally pushed or falls from the table, the hook slips from the clip as soon as a substantial portion of the animal's weight is on the hook, thus preventing the animal from being supported by the tether device in a suspended position from the arm 18 or from the table. When animals of different weights are used on the grooming table, the procedure described above for setting the weight required to disengage the hook from the clip is followed so that each animal, regardless of weight, can be given effective protection with the presence of the clip.

In a modification of the present clip, a scale may be provided on one or both of the two arms 70 and 72 to assist in adjusting the clip to approximately the pounds required to protect a particular animal of a known weight. Further, while the clip is shown and described as having two inwardly extending ends 76 and 78, one such end can be used in combination with a straight end on the other arm, and the open or free ends may be either at the top or bottom, i.e. the clip can be reversed with respect to hook 46 and link 52.

While only one embodiment of the present animal grooming tethering device has been described in detail herein, various changes and modifications may be made without departing from the scope of the invention.

I claim:

1. An animal grooming tethering device comprising a one-piece clip having two resilient wire-like, generally parallel arms and a means connecting said arms at one end thereof, at least one of said arms having an end member on the free end thereof extending inwardly toward the other arm to form a yieldable restriction, a ring-like means extending partially around said restriction and between said arms for engagement with said end member at said restriction, said ring-like means being releasably retained by said end member, a band-like adjustable element of a generally oval shape slidable longitudinally on said arms for varying the force required to displace said end member and to thereby release said ring-like means through said restriction, a member connected to one of said means for supporting said clip, and a leash connected to the other of said means for restraining an animal for grooming.

2. An animal grooming tethering device as defined in claim 1 in which said arms and means connecting the arms at one end thereof form a generally U-shaped configuration with the arms being substantially parallel to one another.

3. An animal grooming tethering device as defined in claim 1 in which an end member is mounted on both of said arms and extend inwardly in substantial contact with one another.

4. An animal grooming tethering device as defined in claim 3 in which said arms and means connecting said arms at one end thereof and said end members are formed of a single piece of resilient metal wire-like material.

5. An animal grooming tethering device as defined in claim 1 in which said arms are substantially parallel to one another and said adjustable element consists of a band extending around said two arms and movable toward and away from said end member.

6. An animal grooming tethering device as defined in claim 1 in which said two arms and said means connecting said arms are constructed of a resilient material and form a generally U-shaped configuration, and each of said arms has an end member thereon extending inwardly toward one another to form a yieldable restriction, and in which said adjustable element consists of a band extending around said arms and movable toward and away from said end members to vary the force required to displace said end members relative to one another to release said ring-like means from said clip.

7. An animal grooming tethering device as defined in claim 4 in which said adjustable element consists of a band slidable on said two arms toward and away from said end members to vary the force required to displace said end members sufficiently to permit said ring-like means to pass through said restriction, and in which said band is yielably retained in an adjusted position by the pressure of said arms thereon.

8. In a tethering device, a safety break-away retaining clip comprising two resilient wire-like, generally parallel arms, means connecting said arms at one end thereof to form a one-piece construction of a generally U-shaped configuration, at least one of said arms having an end member on the free end thereof extending inwardly toward the other arm to form a yieldable restriction, and an adjustable band slidable on said arms for varying the force required to move said end member relative to said other arm.

9. A safety break-away retaining clip as defined in claim 8 in which said arms and means connecting the arms at one end thereof are constructed of resilient material, and both of said arms are provided with end members on the free end thereof extending inwardly toward one another.

* * * * *